United States Patent
Yi et al.

(10) Patent No.: US 8,284,767 B2
(45) Date of Patent: Oct. 9, 2012

(54) CALL PROCESSING METHOD, SYSTEM AND EQUIPMENT OF SAME NUMBER SERVICE

(75) Inventors: Zhiquan Yi, Shenzhen (CN); Guihua Li, Shenzhen (CN); Hongjin Yuan, Shenzhen (CN); Hui Zhu, Shenzhen (CN); Qingchun Shen, Shenzhen (CN); Liyan Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 12/776,309

(22) Filed: May 7, 2010

(65) Prior Publication Data

US 2010/0220719 A1  Sep. 2, 2010

Related U.S. Application Data

(63) Continuation of application No. PCT/CN2008/073543, filed on Aug. 26, 2009.

(30) Foreign Application Priority Data

Aug. 29, 2008 (CN) .......................... 2008 1 0146999

(51) Int. Cl.
 *H04L 12/66* (2006.01)
(52) U.S. Cl. ..................... 370/356; 370/389; 379/221.02
(58) Field of Classification Search .................... None
 See application file for complete search history.

(56) References Cited

U.S. PATENT DOCUMENTS

2003/0022698 A1* 1/2003 Chen et al. .................... 455/564
2007/0238472 A1* 10/2007 Wanless ........................ 455/461
2008/0031436 A1* 2/2008 Der et al. ................. 379/201.02

FOREIGN PATENT DOCUMENTS

| CN | 1411314 A | 4/2003 |
|---|---|---|
| CN | 1541014 A | 10/2004 |
| CN | 101227736 A | 7/2008 |
| EP | 2169895 A1 | 3/2010 |

OTHER PUBLICATIONS

State Intellectual Property Office of the People'S Republic of China, Examination Report in International Patent Application No. PCT/CN2008/073543 (Dec. 3, 2009).

* cited by examiner

*Primary Examiner* — Melanie Jagannathan
(74) *Attorney, Agent, or Firm* — Leydig, Voit & Mayer, Ltd.

(57) ABSTRACT

A call processing method, a call processing system and call processing equipment of a same number service are disclosed. The method includes: receiving a call which is initiated by a calling client and carries an initial called number, and sending a message of the called number with a same number service characteristic to first switching equipment in an IP network when the initial called number is a number of the same number service; and receiving a call request initiated by the first switching equipment, starting same number service processing of the initial called number according to the message carried in the call request, and calling a same number terminal corresponding to the initial called number. The embodiment of the invention helps realize the same number service between a SIP intelligent terminal in the IP network and ordinary terminals in other communication networks.

5 Claims, 5 Drawing Sheets

CALL PROCESSING METHOD, SYSTEM AND EQUIPMENT OF SAME NUMBER SERVICE

CROSS-REFERENCE TO RELATED APPLICATIONS

This application is a continuation of International Application No. PCT/CN2009/073543, filed on Aug. 26, 2009, which claims priority to Chinese Patent Application No. 200810146999.5, filed on Aug. 29, 2008, both of which are hereby incorporated by reference in their entireties.

FIELD OF THE TECHNOLOGY

The invention relates to the communication technical field, in particular to a call processing method, a call processing system and call processing equipment of a same number service.

BACKGROUND

With the rapid development of the broadband network, more and more terminal systems adopt a Session Initiation Protocol (SIP) to realize the call control capability. A SIP intelligent terminal can provide a subscriber with not only functions of an original ordinary telephone such as voice communication but also multimedia communication capabilities such as video communication. Moreover, with the sharp increase in the quantity of ordinary telephones possessed by individual subscribers, usage of the subscriber needs to be extended to the SIP intelligent terminal to further improve subscriber experience.

In use of extended application of the SIP intelligent terminal, one-number service is a novel intelligent service and takes a unified number as a core. The SIP intelligent terminal can be adapted to answer when other subscribers call the number, or the call can be routed to various associated conventional terminals such as a Public Switched Telephony Network (PSTN) telephone and a Public Land Mobile Network (PLMN) terminal, the terminals ring simultaneously, and one of the terminals can be selected to answer the call, the calling party may not know which associated terminal is adopted to answer by the called party and only needs to remember the one-number contacting number without recording other communication means, such as a mobile phone number, an office telephone number and a home telephone number.

In a typical existing service, the SIP intelligent terminal is an IP-based communication terminal, requires an IP-based switch to take charge of routing and call control, and requires to be connected with an existing network. In the one-number service scheme, an actual number is required to be allocated in a current network as a one-number contacting number, and the number can not be the same as the existing numbers in the current network. When the conventional terminal of the current network calls the one-number contacting number, the routing data of the one-number contacting number is required, and the call for the one-number contacting number is routed to one-number service platform and processed thereon. The one-number service platform judges that it is one-number service call, acquires an associated number list of the subscriber, and then initiates new calls for the associated numbers of the number respectively. After the subscriber selects a terminal to answer the call, the one-number service platform establishes a channel between the answering terminal and the calling terminal and releases the calls for other associated numbers, thus the calling party and the called party can communicate with each other.

Existing services have at least has the following problems: The intelligent terminal and the conventional terminal share a logic number in existing systems, but the logic number is different from the number of the conventional terminal and still needs to occupy a number resource of the current network. In addition, the call of the current network is routed to a soft switching network by way of number subscription or number section configuration in the existing scheme, and the scheme can not support the intelligent terminal in the soft switching network and the conventional terminal in the current conventional communication network to use the same number.

SUMMARY

Various embodiments of the invention provide a call processing method, a call processing system and call processing equipment of a same number service, which are configured to realize same number services of an intelligent terminal in an IP network and terminals in the conventional communication networks.

One embodiment of the invention provides a call processing method of a same number service, and the method includes: receiving a call which is initiated by a calling client and carries an initial called number, and sending a message of the called number with a same number service characteristic to first switching equipment in an IP network when the initial called number is a number of a same number service; and receiving a call request initiated by the first switching equipment, starting same number service processing of the initial called number according to the message carried in the call request, and calling a same number terminal corresponding to the initial called number.

One embodiment of the invention also provides a call processing system of a same number service, and the system includes a first service platform in an IP network and a second service platform in a communication network.

The first service platform is configured to: receive a call which is initiated by a calling client and carries an initial called number, send a message of the called number with same number service characteristic to first switching equipment in the IP network when the initial called number is a number of a same number service, receive a call request initiated by the first switching equipment, start same number service processing of the initial called number according to the message carried in the call request, and call a same number terminal corresponding to the initial called number.

The second service platform is configured to perform connection processing according to a third access code after receiving a call which is sent by the first service platform to the same number terminal corresponding to the initial called number.

One embodiment of the invention further provides a service platform in an IP network, and the service platform includes: a receiving unit configured to receive a same number call which is initiated by a calling client and carries an initial called number; a sending unit configured to send a message of the called number with same number service characteristic to first switching equipment in the IP network when the initial called number in the call received by the receiving unit is a number of a same number service; and a processing unit which receives a call request initiated by the first switching equipment and is configured to start same number service processing of the initial called number according to the message carried in the call request, and call a same number terminal corresponding to the initial called number.

Compared with conventional services, in the embodiments of the invention, the service platform sends the message of the called number with the same number service characteristic, starts the same number service processing of the initial called number and calls the same number terminals corresponding to the initial called number respectively so as to realize the same number services of the intelligent terminal in the IP network and the terminal in the conventional communication network.

DETAILED DESCRIPTION

Figure 1:
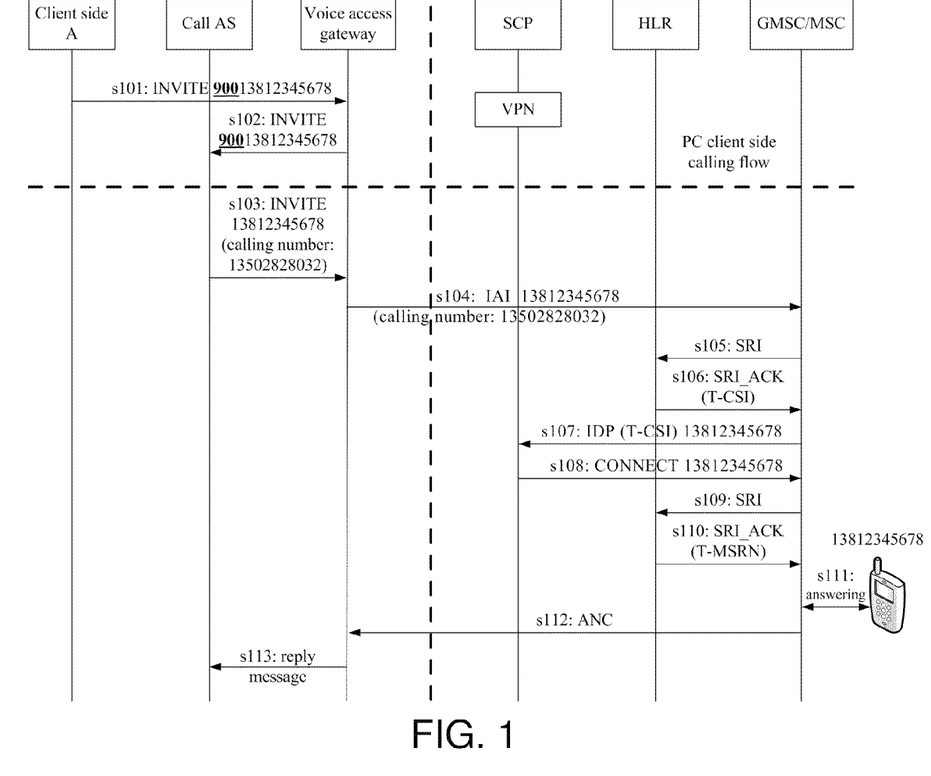
FIG. 1 is a call processing flow diagram of a non-same number service subscribers in an embodiment of the invention.

In the flow that a SIP intelligent terminal calls a non-same number service subscriber in the embodiment of the invention, taking that the SIP intelligent terminal calls a terminal in a Global System for Mobile Communications (GSM) system for example, the call processing flow of the non-same number service subscribers is as shown in FIG. 1 and includes:

s101: A subscriber A calls an ordinary subscriber B with a number 13812345678 through a client, and the client inserts an access code 900 before a called party and submits the call to a voice access gateway through an INVITE message.

s102: The voice access gateway submits the call to a Call Application Server (call AS) through the INVITE message.

s103: The call AS judges that the called party is an ordinary subscriber, sends the called party to the voice access gateway through an INVITE message, and instructs the voice access gateway to route the call to a Gateway Mobile service Switching Center (GMSC).

s104: The voice access gateway constructs a call request to an Initial Address message with additional Information (IAI) and routes the IAI to the GMSC/MSC.

s105: The GMSC/MSC sends a Static Route Information (SRI) signaling to a Home Location Register (HLR), based on a Mobile Application Protocol (MAP), to inquire subscription information of the called party 13812345678.

s106: The HLR returns called information through a SRI_ACK signaling. The returned information includes Terminating-CAMEL Subscription Information (T-CSI) if the called party is a subscriber of an intelligent network; otherwise, the returned information does not include the T-CSI.

s107: The GMSC/MSC according to the returned information judges and reports a channel to an intelligent service platform, such as an Service Control Point (SCP), through an Initial Detection Point (IDP) signaling, based on a CAMEL Application Part (CAP) protocol, if the returned information includes T-CSI data; otherwise, inquires a roaming number of the called party from the HLR, and then directly calls the called party.

s108: The SCP sends a CONNECT signaling to instruct the GMSC/MSC to connect the called party.

s109: The GMSC/MSC inquires the roaming number of the called party from the HLR through an SRI.

s110: The HLR responds to the GMSC/MSC through SRI_ACK (T-MSRN).

s111: The GMSC/MSC calls the called party which then answers.

s112: The GMSC/MSC replies an ANswer signal, Charge (ANC) message to the voice access gateway.

s113: The voice access gateway reports a reply message to the call AS.

Then, the call AS instructs the voice access gateway to connect a PC with a Phone, and the calling PC starts to communicate with the called Phone.

Figure 2:
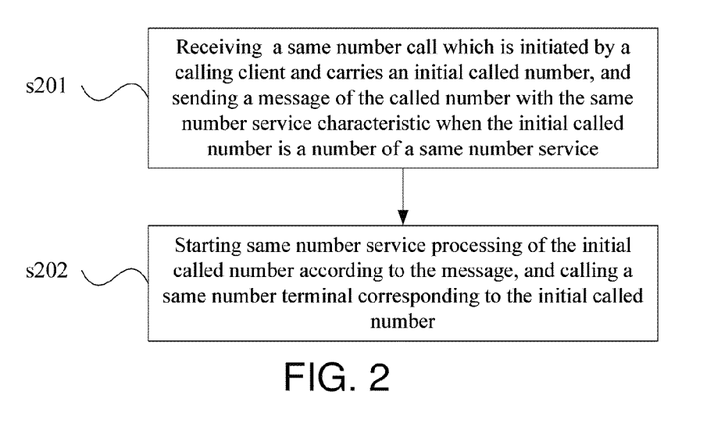
FIG. 2 is a flow diagram of a call processing method of a same number service in an embodiment of the invention.

The embodiment of the invention further provides a call processing method of a same number service as shown in FIG. 2, and the method includes:

step s201, receiving a same number call which is initiated by a calling client and carries an initial called number, and sending a message of the called number with the same number service characteristic when the initial called number is a number of a same number service.

In the step, the calling client is a SIP client; the message of the called number with the same number service characteristic includes the called number called by the calling client and a second access code adapted to identify the same number service characteristic.

After sending the message of the called number with the same number service characteristic, the method further includes: receiving a call request which is sent by first switching equipment according to a second access code in the message and the call request includes the message.

step s202, starting same number service processing of the initial called number according to the message, and calling a same number terminal corresponding to the initial called number.

In the step, the same number terminals include: a set-top box, a mobile terminal and a fixed terminal.

When the same number terminal corresponding to the initial called number and the calling client are located in a same soft switching network, the method further includes: inquiring a soft number corresponding to the initial called number according to the message, and calling the same number terminal corresponding to the soft number according to the soft number. Specifically, the method further includes: inquiring the soft number corresponding to the initial called number according to the message, sending the soft number to the first switching equipment, and connecting the same number terminal which is located in the same soft switching network as the calling client according to the soft number when the first switching equipment receives the soft number;

When the same number terminal corresponding to the initial called number and the calling client are located in different communication networks, the method includes: adding a third access code before the calling number or the initial called number according to the message, calling the same number terminal corresponding to the initial called number according to the initial called number, and performing, by the communication network in which the same number terminal is located, connection processing according to the third access code. Specifically, the method includes: adding the third access code before the calling number or the initial called number according to the message, sending the calling number or the initial called number added with the third access code to the first switching equipment, and connecting the first switching equipment to the communication network in which the same number terminal is located according the initial called number when the first switching equipment receives the call in which the third access code is added before the calling number or the initial called number; and performing, by the communication network in which the same number terminal is located, the connection processing according to the third access code. Performing, by the communication network in which the same number terminal is located, the connection processing according to the third access code includes: acquiring, by second switching equipment in the communication network in which the same number terminal is located, subscription information of the initial called number in the call; connecting, by the second switching equipment, the call to a second service platform in the communication network in which the same number terminal is located according to the subscription information; judging, by the second service platform, that the call is an incoming call of a same number service platform according to the third access code carried in the call; and instructing, by the second service platform, the second switching equipment to call the initial called number in the communication network in which the same number terminal is located.

In the embodiment of the invention, the service platform sends the message of the called number with the same number service characteristic, starts the same number service processing of the initial called number and respectively calls the same number terminals corresponding to the initial called number, which realizes the same number service of the SIP intelligent terminal in the soft switching network and the terminal in the conventional communication network.

Intercommunication between the IP network and the GSM network is taken as an example below to describe the call processing method of the same number service across networks in the embodiment of the invention. The switching equipment in the GSM network includes the MSC/GMSC. The switching equipment is the MSC of a place visited by the calling party if the calling party is a subscriber in the GSM network; and the switching equipment is the GMSC at a joint between the GSM network and the network in which the calling party is located if the calling party is other subscriber outside the GSM network. The service platform in the GSM network can be the SCP of the intelligent service platform. The switching equipment in the IP network includes the voice access gateway, and the service platform in the IP network can be the call AS.

Figure 3:
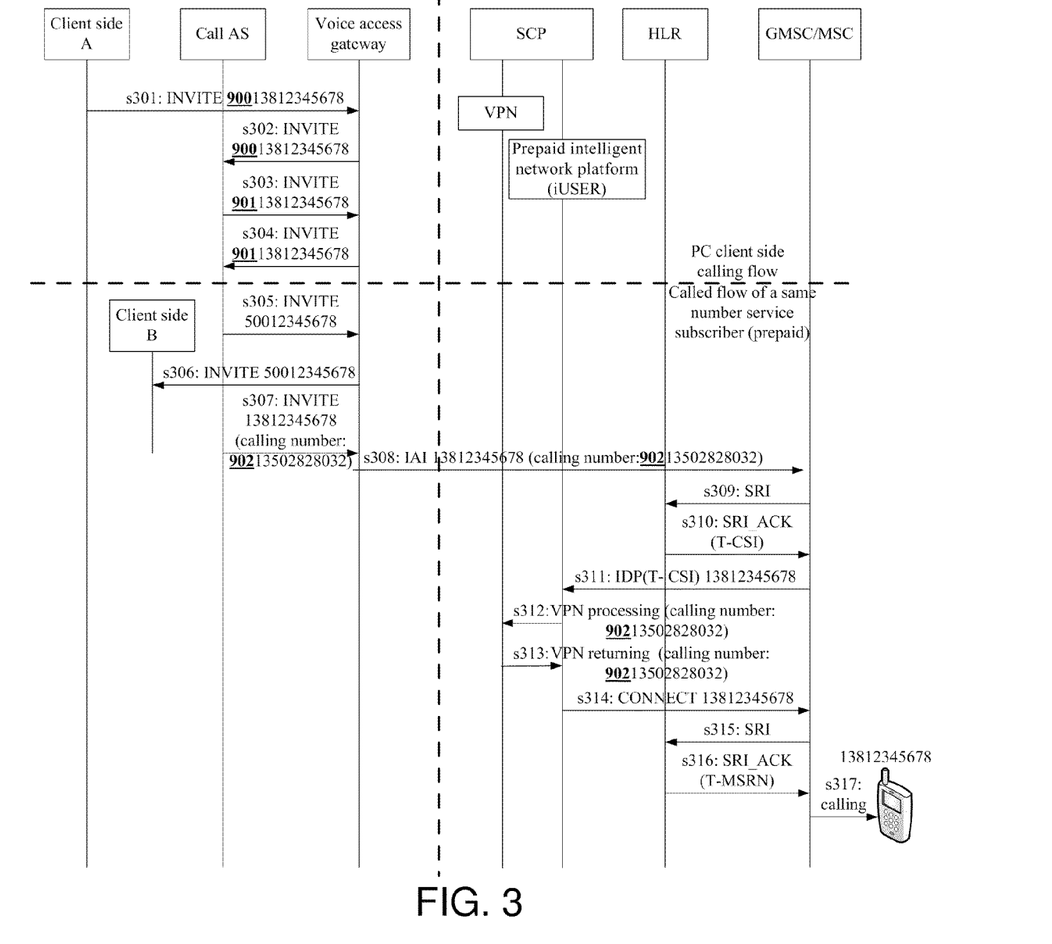
FIG. 3 is a flow diagram of a call processing method of a same number service across networks when a SIP intelligent terminal calls a subscriber of a prepaid same number service in the first embodiment of the invention.

The first embodiment of the invention provides a call processing method of a same number service across the networks when a SIP intelligent terminal calls a subscriber of a prepaid same number service, and as shown in FIG. 3, the method includes as follows:

s301: A subscriber A calls a same number service subscriber B with a number 13812345678 through a client, and the client inserts an access code 900 before a called number and reports a call to a voice access gateway through an INVITE message.

s302: The voice access gateway reports the call to a call AS through an INVITE message.

s303: The call AS analyzes and judges that the called number is a subscriber of the same number service, sends an INVITE message to the voice access gateway, and modifies the access code before the called number to 901.

s304: The voice access gateway judges that the called number has the access code 901, and reports the call to the call AS through the INVITE message again.

In the step s302, the call AS is taken as the AS of the calling side, but in the step s304, the call AS is taken as the AS of the called side, and both of the AS of the calling side and the AS of the called side can be physically realized in a same entity.

s305: The call AS analyzes that the access code before the called number is 901, inquires that a soft number corresponding to the called party is 50012345678, and sends an INVITE message to the voice access gateway to instruct the voice access gateway to call the client in which the called party B is located.

s306: The voice access gateway calls the client in which the called party B is located.

s307: The call AS sends an INVITE message to the voice access gateway for the called number 13812345678 while inserting the access code 902 before the calling number 13502828032, and instructs the voice access gateway to call a mobile telephone of the called party B.

s308: The voice access gateway constructs an IAI message to route the call to a GMSC/MSC, in which the called number is 13812345678 and the calling number is still 90213502828032.

s309: The GMSC/MSC sends an SRI signaling to an HLR to inquire subscription information of the called number 13812345678 based on an MAP.

s310: The HLR returns the subscription information (T-CSI) of the called number through an SRI_ACK signaling.

s311: The GMSC/MSC judges that the called party is a prepaid subscriber according to the returned T-CSI data, thus reports a channel to a prepaid intelligent network platform through an IDP signaling.

s312: The prepaid intelligent network platform such as iUSER platform judges that the call is a VPN subscriber, and then reports the call to a VPN intelligent network platform.

s313: The VPN judges that the call is an incoming call from a same number service platform (i.e. call AS) because the access code before the calling party is 902, then eliminates the access code 902 before the calling party and returns the call to the prepaid intelligent network platform.

s314: The prepaid intelligent network platform sends a CONNECT signaling to instruct the GMSC/MSC to connect the called party.

s315: The GMSC/MSC inquires a roaming number of the called party from the HLR through an SRI.

s316: The HLR responds to the GMSC/MSC through SRI_ACK (T-MSRN).

s317: The GMSC/MSC calls the called party.

If the called party B is answered by the client preferably, the call AS instructs the voice access gateway to disconnect a link with the GMSC/MSC; and if the called party B is answered by the mobile phone preferably, the call AS instructs the voice access gateway to disconnect the link with a PC. Then, the calling party and the called party communicate with each other.

As shown in the steps s301-s317, entities in the current network require corresponding changes:

The call AS requires to be respectively configured with the access codes which are sent to the voice access gateway to report and route the call, such as the access codes 901 and 902 described in above steps; the voice access gateway requires to be configured with route address information corresponding to different access codes, for example, the call is routed to the call AS when the access code is 901, and the call is routed to the GMSC/MSC when the access code is 902. For the GMSC/MSC, the GMSC connected with an NGN needs to support a calling number which has at least 12 characters; for the calling party with the access code such as 902, the HLR is inquired to acquire T_CSI, and then the prepaid service and the VPN service are triggered according to the T_CSI; and the access code must be carried with the calling number when the call is trigged to the VPN service platform. In addition, the T-CSI is guaranteed not to be triggered after receiving the message which is sent by the SCP and instructs to connect the called party, and the called party is directly called after inquiring the roaming number (MSRN) of the called party from the HLR through an SRI message.

Moreover, as the called party is a prepaid subscriber, the channel is certainly reported to the prepaid intelligent network platform; meanwhile, the called party is also the VPN subscriber, thus the prepaid intelligent network platform will submit the channel to the VPN for processing, and the VPN returns the channel to the prepaid intelligent network platform after processing; at that moment, the prepaid intelligent network platform withdraws and then sends the message to instruct the GMSC/MSC to connect the called party.

Figure 4:
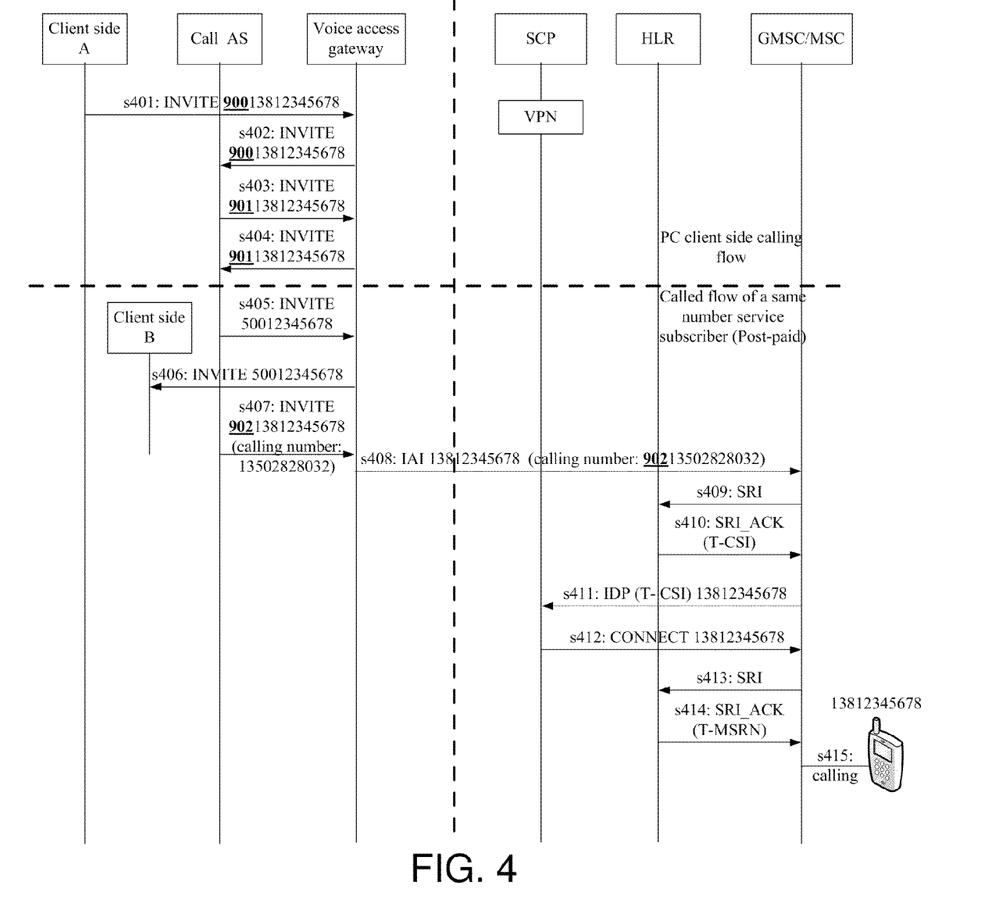
FIG. 4 is a flow diagram of a call processing method of a same number service across networks when a SIP intelligent terminal calls a subscriber of a post-paid same number service in the second embodiment of the invention.

The second embodiment of the invention provides a call processing method of a same number service across networks when a SIP intelligent terminal calls a subscriber of a post-paid same number service. As shown in FIG. 4, the method includes the following steps:

s401: A subscriber A calls a same number service subscriber B with a number 13812345678 through a client, and the client inserts an access code 900 before a called number and reports a call to a voice access gateway through an INVITE message.

s402: The voice access gateway reports the call to a call AS through an INVITE message.

s403: The call AS analyzes and judges that the called number is a subscriber of the same number service, sends an INVITE message to the voice access gateway, and modifies the access code before the called number to 901.

s404: The voice access gateway judges that the access code before the called number is 901, and reports the call to the call AS through the INVITE message again.

s405: The call AS analyzes that the access code before the called number is 901, inquires that a soft number corresponding to the called party is 50012345678, and sends an INVITE message to the voice access gateway to instruct the voice access gateway to call the client in which the called party B is located.

s406: The voice access gateway calls the client in which the called party B is located.

s407: The call AS sends an INVITE message to the voice access gateway for the called number 13812345678 while inserting the access code 902 before the calling number 13502828032, and instructs the voice access gateway to call a mobile telephone of the called party B.

s408: The voice access gateway constructs an TAT message to route the call to a GMSC/MSC, in which the called number is 13812345678 and the calling number is still 90213502828032.

s409: The GMSC/MSC sends an SRI signaling to an HLR to inquire subscription information of the called number 13812345678 based on an MAP.

s410: The HLR returns the subscription information (T-CSI) of the called number through an SRI_ACK signaling.

s411: The GMSC/MSC judges that the called party is a VPN subscriber according to the returned T-CSI data, thus reports a channel to the VPN intelligent network platform through an IDP signaling.

s412: The VPN judges that the call is the incoming call from a same number service platform (i.e. call AS) because the access code before the calling party is 902, then eliminates the access code 902 before the calling party and sends a CONNECT signaling to instruct the GMSC/MSC to connect the called party.

s413: The GMSC/MSC inquires a roaming number of the called party from the HLR through an SRI.

s414: The HLR responds to the GMSC/MSC through an SRI_ACK (T-MSRN).

s415: The GMSC/MSC calls the called party.

If the called party B is answered by the client preferably, the call AS instructs the voice access gateway to disconnect a link with the GMSC/MSC; and if the called party B is answered by the mobile phone preferably, the call AS instructs the voice access gateway to disconnect the link with a PC. Then, the calling party and the called party communicate with each other.

As shown in the steps s401-s415, entities in the current network require corresponding changes:

The call AS requires to be respectively configured with the access codes which are sent to the voice access gateway to report and route the call, such as the access codes 901 and 902 described in above steps; the voice access gateway requires to be configured with route address information corresponding to different access codes, for example, the call is routed to the call AS when the access code is 901, and the call is routed to the GMSC/MSC when the access code is 902. For the GMSC/MSC, the GMSC connected with a NGN needs to support a calling number which has at least 12 characters; for the calling party with the access code such as 902, the HLR is inquired to acquire T_CSI, and then the prepaid service and the VPN service are triggered according to the T_CSI; and the access code must be carried with the calling number when the call is trigged to the VPN service platform. In addition, the T-CSI is guaranteed not to be trigged after receiving the message which is sent by the SCP and instructs to connect the called party, and the called party is directly called after inquiring the roaming number (MSRN) of the called party from the HLR through the SRI message.

As the called party is a post-paid subscriber, the GMSC/MSC acquires the T-CSI data of the called party and then report the data directly to the VPN which serving the called party; and the VPN eliminates a prefix after processing and sends a CONNECT message to instruct the GMSC/MSC to connect the called party.

By virtue of the embodiments of the invention, the access code is added to the call, the first switching equipment in the IP network routes the call initiated in the IP network to the first service platform in the IP network and the second switching equipment in the first communication network according to the access code, and initiates the call for the called number which subscribes the same number service at the corresponding same number service terminals in the IP network and the first communication network, thus realizing the same number services of the SIP intelligent terminal in the IP network and the terminal in the conventional communication network.

Figure 5:
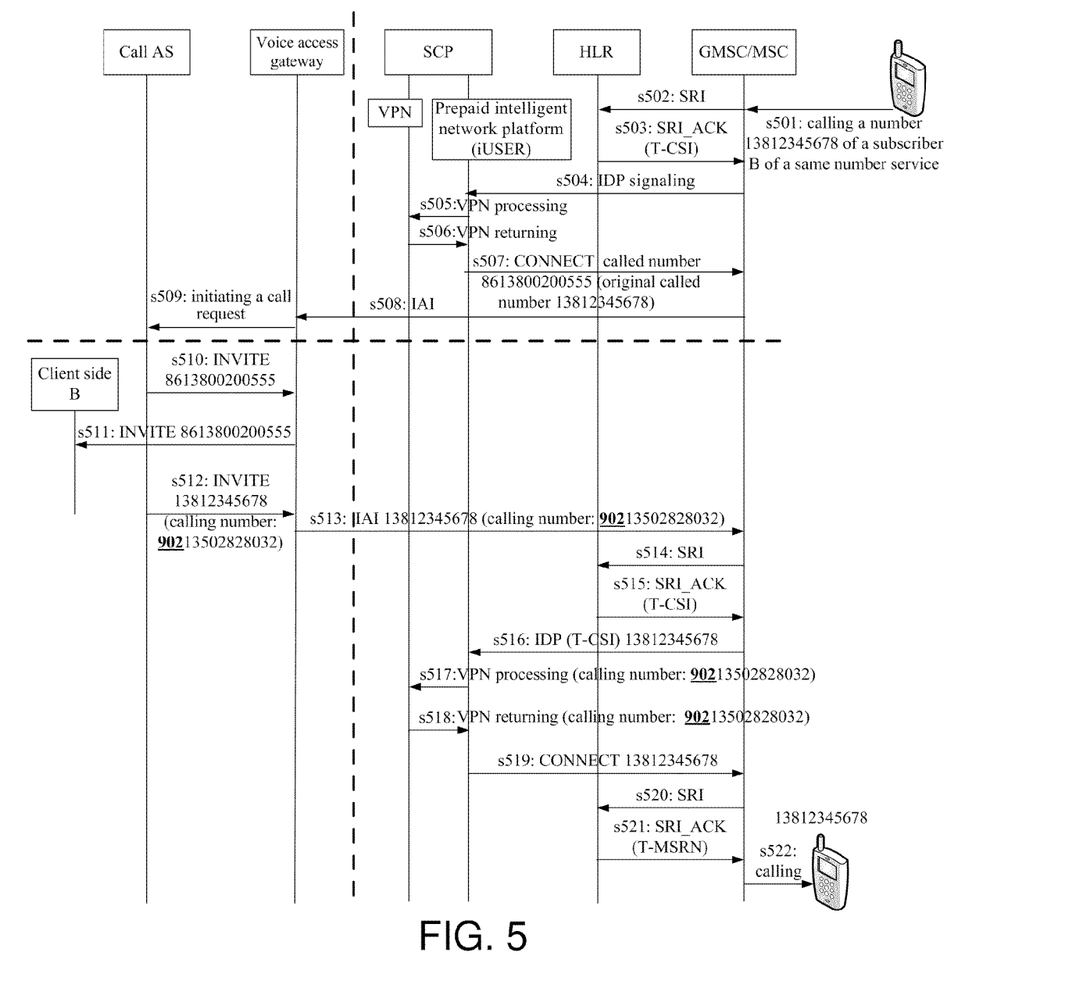
FIG. 5 is a flow diagram of a call processing method of a same number service across networks when an ordinary terminal calls a subscriber of a prepaid same number service in the third embodiment of the invention.

The third embodiment of the invention provides a call processing method of a same number service across the networks when an ordinary terminal calls a subscriber of the same number service, and as shown in FIG. 5, taking the prepaid same number service as an example, the method specifically includes the following steps:

s501: A subscriber A calls a number 13812345678 of a subscriber B of a same number service in which the subscriber A is an ordinary terminal such as a mobile phone terminal, and the call of the subscriber A is routed to an GMSC/MSC of the called party after processing a calling flow in a PLMN network.

s502: The GMSC/MSC sends an SRI signaling to an HLR to inquire subscription information of the called number 13812345678, based on an MAP.

s503: The HLR returns the subscription information (T-CSI) of the called party through an SRI_ACK signaling.

s504: The GMSC/MSC judges that the called party is a prepaid subscriber according to the returned T-CSI data, thus reports a channel to a prepaid intelligent network platform through an IDP signaling.

s505: The prepaid intelligent network platform judges that the called subscriber is a VPN subscriber again, and reports the call to a VPN intelligent network platform.

s506-s507: the VPN judges that the called party is the subscriber of the same number service, then forwards the called party, that is, converts the called number to 8613800200555, and sends a CONNECT signaling to instruct the GMSC/MSC to connect the called party, wherein the called number in the CONNECT signaling is 8613800200555 and the original called number in the CONNECT signaling is 13812345678.

s508: The GMSC/MSC forwards the original called number 13812345678 to a voice access gateway through an IAI message according to the called number 8613800200555, and sets flag of the forwarding time as one.

s509: The voice access gateway initiates a call request to a call AS; the call AS performs service logic processing after acquiring information of the called number 8613800200555 and the original called number 13812345678, and resets the flag of the forwarding time.

s510: The call AS sends an INVITE message to the voice access gateway for the called number 8613800200555 to instruct the voice access gateway to call the client in which the subscriber B is located.

s511: The voice access gateway calls the client in which the subscriber B is located.

s512: The call AS sends an INVITE message to the voice access gateway for the called number 13812345678 while inserting an access code 902 before the calling number 13502828032, and instructs the voice access gateway to call a mobile telephone of the subscriber B.

s513: The voice access gateway constructs an IAI message to route the call to the GMSC/MSC, in which the called number is 13812345678 and the calling number is still 90213502828032.

s514: the GMSC/MSC sends an SRI signaling to the HLR to inquire the subscription information of the called number 13812345678 based on the MAP.

s515: The HLR returns the subscription information (T-CSI) of the called party through the SRI_ACK signaling.

s516: The GMSC/MSC judges that the called party is the prepaid subscriber according to the returned T-CSI data, thus reports a channel to the prepaid intelligent network platform through the IDP signaling.

s517: The prepaid intelligent network platform judges that the called subscriber is the VPN subscriber, and reports the call to the VPN intelligent network platform.

s518-s519: The VPN judges that the call is an incoming call of a same number service platform because the access code before the calling party is 902, eliminates the access code 902 before the calling party and sends the CONNECT signaling to instruct the GMSC/MSC to connect the called party.

s520: The GMSC/MSC inquires a roaming number of the called party from the HLR through an SRI.

s521: The HLR responds to the GMSC/MSC through the SRI_ACK (T-MSRN).

s522: The GMSC/MSC calls the called party.

If the called party B is answered by the client preferably, the call AS instructs the voice access gateway to disconnect a link with the GMSC/MSC; and if the called party B is answered by the mobile phone preferably, the call AS instructs the voice access gateway to disconnect the link with a PC. Then, the calling party and the called party communicate with each other.

Alternatively, if the called party is the post-paid subscriber, in the step s504, after acquires the T-CSI of the called party, the GMSC/MSC directly reports a channel to the VPN which serving the called party instead of reporting the channel to the VPN intelligent network platform through the prepaid intelligent network platform; in the steps s506-507, the VPN eliminates the access code after processing and sends the CONNECT message to instruct the GMSC/MSC to connect the called party, and the CONNECT message does not need to be forwarded through the prepaid platform. Accordingly, in the step s516, the GMSC/MSC also directly reports the channel of the called party to the VPN which serving the called party after acquires the T-CSI data of the called party; in the steps s518-519, the VPN eliminates the prefix after processing and sends the CONNECT message to instruct the GMSC/MSC to connect the called party, and also the sent message does not need to be forwarded through the prepaid platform. The service and signaling flows (Integrated Services Digital Network User Part (ISUP), CAMEL Application Part (CAP) and Real-time Transport Protocol (MAP)) and related net elements (the MSC, the GMSC, the HLR and the SCP) described in the embodiments of the invention are explained by taking that the communication network is the GSM network as an example. The voice access gateway (SoftSwitch+TMG+SG) is also an example of the scheme, takes charge of accessing the GSM network to the same number service system of the scheme and has the functions of adapting the GSM network and converting a voice signaling (ISUP) and a media stream (No. 7 Signal Protocol) in the GSM network to the voice signaling (SIP) and the media stream (Real-time Transport Protocol (RTP)) in the IP network. With respect to a Code Division Multiple Access (CDMA) network and a Public Switched Telephone Network (PSTN), the voice signaling and the media stream are similar to those of the GSM network, the CDMA network and the PSTN can be adapted using the voice access gateway (SoftSwitch+TMG+SG) after the corresponding net elements thereof are subject to the same modification, and accessed to the same number service system of the scheme; with respect to the WCDMA R4 network, the voice signaling thereof mainly adopts a Bearer Independent Call Control (BICC) Protocol, can adopt (MSC Server+MGW) as the voice access gateway to access to the same number service system of the scheme; and with respect to the CDMA2000 network, the WCDMA R5 network and the IMS network, the voice signaling mainly adopts the SIP and can be directly accessed to the soft switching network in the embodiment of the invention through SIP server. Therefore, the embodiments of the invention are also applicable to intercommunication among the PSTN, the CDMA network, the 3G network, the IMS network and the soft switching network.

The embodiment of the invention also provides a call processing system of a same number service, and the system includes a first service platform in a soft switching network and a second service platform in a first communication network.

The first service platform is adapted to receive a same number call which is initiated by a calling client and carries an initial called number, send a message of the called number with the same number service characteristic when the initial called number is a number of the same number service, start same number service processing of the initial called number according to the message, add a third access code before the calling number or the initial called number, and call a same number terminal corresponding to the initial called number according to the initial called number.

The second service platform is adapted to perform connection processing according to the third access code after receiving the call which is sent by the first service platform to the same number terminal corresponding to the initial called number.

Figure 6:
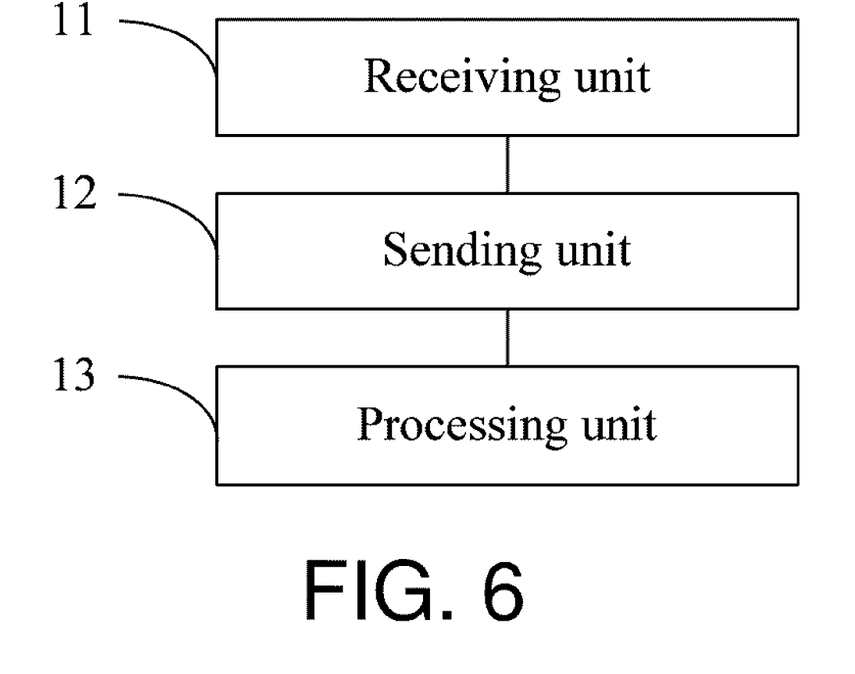
FIG. 6 is a structural schematic diagram of a service platform in the embodiment of the invention.

The embodiment of the invention further provides a service platform which is located in a soft switching network. Specifically, as shown in FIG. 6, the service platform in the soft switching network can further include: a receiving unit 11 configured to receive a same number call which is initiated by a calling client and carries an initial called number; a sending unit 12 configured to send a message of the called number with the same number service characteristic when the initial called number in the call received by the receiving unit 11 is a number of a same number service; and a processing unit 13 configured to start same number service processing of the initial called number according to the message, and call a same number terminal corresponding to the initial called number.

The processing unit 13 is specifically configured to inquire a soft number corresponding to the initial called number according to the message and call the same number terminal corresponding to the soft number according to the soft number.

Alternatively, the processing unit 13 is configured to: add a third access code before the calling number or the initial called number, call the same number terminal corresponding to the initial called number according to the initial called number, and instruct a communication network in which the same number terminal is located to perform connection processing according to the third access code.

Figure 7:
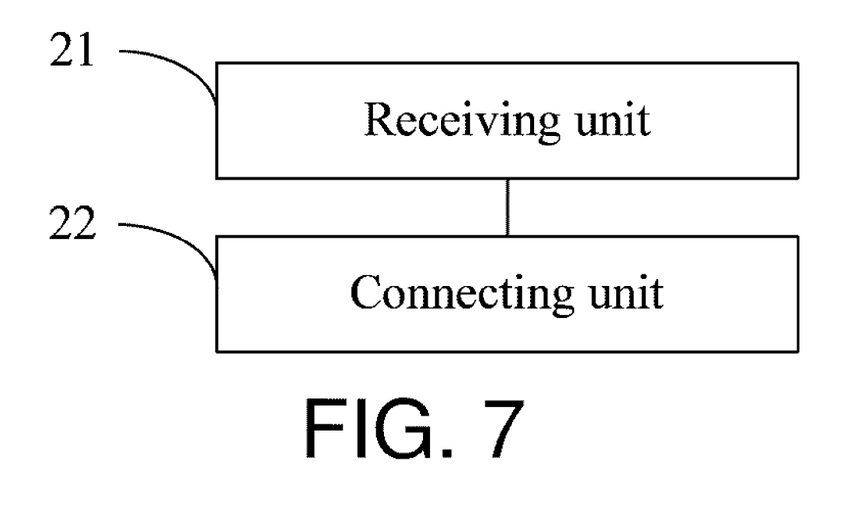
FIG. 7 is a structural schematic diagram of switching equipment in the embodiment of the invention.

The embodiment of the invention further provides switching equipment which is located in a soft switching network. Specifically, as shown in FIG. 7, the switching equipment in the soft switching network can further include: a receiving unit 21 configured to receive a message which is sent by a service platform in the soft switching network and carries different access codes; and a connecting unit 22 configured to connect the same number terminal corresponding to the initial called number according to the different access codes.

The method, device and system of the embodiment of the invention can be further applied to other IP networks such as the IMS network, and the implementation procedure is similar and not repeated here.

By virtue of the embodiments of the invention, the service platform in the IP network sends the message of the called number with the same number service characteristic, starts the same number service processing of the initial called number and respectively calls the same number terminals corresponding to the initial called number, thus realizing the same number services of the SIP intelligent terminal in the IP network and the terminal in the conventional communication network.

From the description of the embodiments, those skilled in the art can clearly know that the invention can be realized by hardware or software plus a necessary general-purpose hardware platform. Based on the understanding, the technical scheme of the invention can be embodied in the form of a software product, and the software product can be stored in a nonvolatile storage media (which can be a CD-ROM, a U disc, a mobile hard disc, etc.) and includes a plurality of commands to cause computer equipment (which can be a PC, a server or network equipment, etc.) to implement the methods of various embodiments of the invention.

The above are the preferred embodiments of the invention only, but the invention is not limited to the embodiments; and any change made by ordinary skill in the art without creative labor should be merged in the protection scope of the invention.

What is claimed is:

1. A call processing method of a same number service, comprising:
    receiving, by a first service platform in an IP network, a call which is initiated by a calling client and carries an initial called number when the calling client is a session initiation protocol (SIP) client in the IP network, and sending a message to a first switching equipment in the IP network when the initial called number is a number of the same number service wherein the message carries the initial called number with a same number service characteristic;
    receiving, by the first service platform, a call request which is initiated by the first switching equipment and carries the message;
    adding, by the first service platform, a third access code before a calling number or the initial called number according to the message, sending the calling number added with the third access code or the initial called number added with the third access code to the first switching equipment, and connecting the first switching equipment to a communication network in which the same number terminal is located according to the initial called number when the first switching equipment receives a call in which the third access code is added before the calling number or the initial called number, wherein the same number terminal which corresponds to the initial called number and the calling client are located in different communication networks;
    acquiring, by a second switching equipment in the communication network in which the same number terminal is located, subscription information of the initial called number in the call;
    connecting, by the second switching equipment, the call to a second service platform in the communication network in which the same number terminal is located according to the subscription information;
    judging, by the second service platform, that the call is an incoming call of a same number service platform according to the third access code carried in the call; and
    instructing, by the second service platform, the second switching equipment to call the initial called number in the communication network in which the same number terminal is located.

2. The method according to claim 1, wherein the message carrying the called number with the same number service characteristic comprises a called number which is called by the calling client and a second access code adapted to identify the same number service characteristic; and after the process of sending the message carrying the called number with a same number service characteristic to first switching equipment in an IP network, the method further comprises:

receiving the call request which is sent by the first switching equipment according to the second access code in the message and comprises the message.

3. A call processing method of a same number service, comprising:

receiving, by a second service platform in a conventional communication network in which a same number conventional terminal corresponding to an initial called number is located, a call request which is triggered by a second switching equipment in the conventional communication network in which the same number conventional terminal corresponding to the initial called number is located according to subscription information of the initial called number acquired by the second switching equipment;

performing, by the second service platform, forwarding processing when the second service platform judges that the initial called number is a number of the same number service, sending a connection message carrying the initial called number and a forwarding number to the second switching equipment, and sending the initial called number and the forwarding number to a first switching equipment through the second switching equipment such that the first switching equipment sends the call request carrying the initial called number and the forwarding number to the first service platform in the IP network; and receiving, by the first service platform in the IP network, the call request initiated by the first switching equipment, starting the same number service processing of the initial called number according to the message carried in the call request, and calling the same number terminal corresponding to the initial called number.

4. The method according to claim 3, wherein when the same number terminal corresponding to the initial called number and the calling client are located in the different communication networks, that the first service platform starts the same number service processing of the initial called number according to the message and calls the same number terminal corresponding to the initial called number comprises:

adding, by the first service platform, a third access code before a calling number or the initial called number according to the message, and calling the same number terminal corresponding to the initial called number according to the initial called number; and performing, by the communication network in which the same number terminal is located, the connection processing according to the third access code.

5. A service platform located in an IP network, comprising:

a receiving unit configured to receive a call which is initiated by a calling client and carries an initial called number when the calling client is a session initiation protocol (SIP) client in the IP network;

a sending unit configured to send a message to a first switching equipment in the IP network when the initial called number is a number of the same number service wherein the message carries the initial called number with a same number service characteristic; and a processing unit configured to receive a call request which is initiated by the first switching equipment and carries the message, add a third access code before a calling number or the initial called number according to the message, send the calling number added with the third access code or the initial called number added with the third access code to the first switching equipment, and connect the first switching equipment to a communication network in which the same number terminal is located according to the initial called number when the first switching equipment receives a call in which the third access code is added before the calling number or the initial called number, wherein the same number terminal corresponding to the initial called number and the calling client are located in different communication networks.

* * * * *